United States Patent [19]

Ikawa et al.

[11] 4,345,982

[45] Aug. 24, 1982

[54] PROCESS FOR THE PRODUCTION OF HYDROGEN UTILIZING A PHOTOGALVANIC EFFECT OF A POLYACID ION

[75] Inventors: Tsuneo Ikawa, Kamakura; Toshihiro Yamase, Yokohama, both of Japan

[73] Assignee: Tokyo Institute of Technology, Tokyo, Japan

[21] Appl. No.: 237,905

[22] Filed: Feb. 25, 1981

[30] Foreign Application Priority Data

Mar. 5, 1980 [JP] Japan .................................. 55-26722

[51] Int. Cl.$^3$ .............................................. C25B 1/10
[52] U.S. Cl. .................................................. 204/129
[58] Field of Search .......................... 204/129, 157.1 R

[56] References Cited

U.S. PATENT DOCUMENTS 4,227,977 10/1980 Grantham ........................... 204/129
4,244,794 1/1981 Hollabaugh et al. ................ 204/129

Primary Examiner—R. L. Andrews
Attorney, Agent, or Firm—Spencer & Kaye

[57] ABSTRACT

A process for the production of hydrogen is disclosed. This process utilizes a photogalvanic effect of a polyacid ion and comprises immersing an anode into an aqueous solution of an alkylammonium salt of polytungstic acid or polyvanadic acid as an anode electrolyte, immersing a cathode into an aqueous solution of an acid as a cathode electrolyte, isolating both said aqueous solutions to each other, electrically connecting both said electrodes to each other, and irradiating a light onto said anode electrolyte, whereby hydrogen is evoluted at said cathode.

10 Claims, 1 Drawing Figure

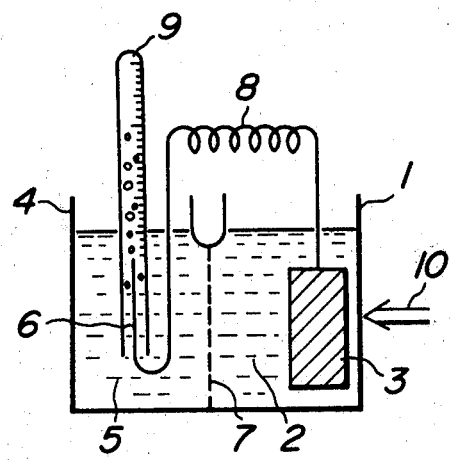

PROCESS FOR THE PRODUCTION OF HYDROGEN UTILIZING A PHOTOGALVANIC EFFECT OF A POLYACID ION

BACKGROUND OF THE INVENTION

The present invention relates to a process for the production of hydrogen, wherein hydrogen gas is produced from a cathode or an opposite electrode by photoelectrolysis of water utilizing the photoreactivity of an electrolyte or the so-called photogalvanic effect without utilizing the photochemical effect of the electrode itself.

Heretofore, the use of a semiconductor electrode has been described in Chemical Engineering News, Sept. 3, 1979, page 29 in a process for producing hydrogen fuel by electrolysis of water utilizing sun light. However, this process employs the photochemical effect of the semiconductor itself, so that the kind of semiconductor to be used is restricted. Furthermore, the electrode itself is subjected to a photo-dissolution reaction, so that many steps required to prevent the occurrence of the photo-dissolution reaction. Therefore, semiconductor electrodes which can produce hydrogen with high efficiency have not yet been developed.

SUMMARY OF THE INVENTION

The present invention is different from the photoelectrolysis of water utilizing the photochemical effect of the conventional semiconductor electrode. The present invention is based on the discovery that when an aqueous solution containing an alkylammonium salt of polytungstic acid or polyvanadic acid is used as an anode electrolyte, and light corresponding to the absorption light of the polyacid ion is irradiated onto the above aqueous solution, there is produced a large potential difference between the irradiated part of the solution and the non-irradiated part of an electrolyte present in a dark chamber during the light irradiation (which is called the photogalvanic potential) and in addition there is produced in the electrolyte an active material which reacts at the anode. In this case, the irradiated part always indicates a negative potential with respect to the non-irradiated part. That is, the active material for the electrode developing the photogalvanic effect by light irradiation exhibits a high reduction force (i.e. a large reduction potential). According to the invention, there is provided a process for producing hydrogen gas from water by the reduction of proton (H+) utilizing the above mentioned high reduction force of the active material.

BRIEF DESCRIPTION OF THE DRAWINGS

The present invention will now be described in greater detail with reference to the accompanying drawing, wherein:

The single FIGURE is a schematic view of an embodiment of the apparatus for producing hydrogen gas according to the present invention.

DETAILED DESCRIPTION OF THE INVENTION

In the FIGURE, numeral 1 represents an anode chamber, numeral 2 an aqueous solution containing an alkylammonium salt of polytungstic acid or polyvanadic acid contained in the anode chamber, numeral 3 an anode, numeral 4 a cathode chamber, numeral 5 an aqueous solution of an acid contained in the cathode chamber, numeral 6 a cathode, numeral 7 a glass frit partition, numeral 8 a wire for connecting the anode to the cathode, and numeral 9 a gas burette.

According to the present invention, a photo-electrochemical cell provided with the anode and cathode is first assembled as shown in the FIGURE and then the anode chamber is filled with an aqueous solution containing an alkylammonium salt of polytungstic acid or polyvanadic acid as an anode electrolyte, while the cathode chamber is filled with an aqueous solution of an acid such as sulfuric acid or the like as a cathode electrolyte. Next, when light represented by numeral 10 is irradiated on to the anode electrolyte, a photoredox reaction between water and polyacid ion is caused in the anode chamber, whereby water is oxidized to form a hydroxyl radical (.OH) and polyacid ion is reduced to $W^{6+} \rightarrow W^{5+}$ or $V^{5+} \rightarrow V^{4+}$. In this case, the chemical reaction for the reduction of the polyacid ion is given by the following equations (1) and (2):

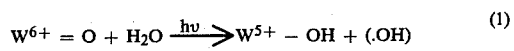  (1)

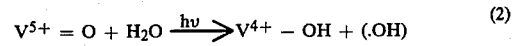  (2)

The thus produced active material for the electrode, $W^{5+}$—OH or $V^{4+}$—OH, emits an electron (e) at the anode 3 owing to its strong reduction force. This emitted electron (e) is transported through an outer circuit or wire 8 to the cathode 6, where the electron reacts with a proton (H+) existent in the cathode chamber 4 to produce hydrogen gas (H$_2$). At these electrodes, there are given the following reaction equations (3)-(5).

Anode:   (3)

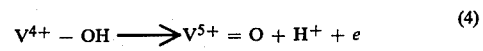  (4)

Cathode:   (5)

Considering the equations (1)-(5), it can be seen that the reaction given by the following equation:

occurs in the photo-electrochemical cell according to the present invention as a whole.

As a result of the light irradiation, the hydroxyl radical (.OH) produced by the oxidation of water is accumulated in the anode chamber. Since the hydroxyl radical is chemically unstable, it successively reacts with the polyacid ion to form polyacid peroxides, the details of which are not clear at present. However, such polyacid peroxides are not significant in the present invention.

On the other hand, the presence of alkylammonium ion is an essential factor in order to provide the active material for the electrode produced by the photoreduction, with a sufficiently stable life for producing the electrode reaction [given by equation (3) or (4)].

As described above, a part of the polyacid ion loses its photoreactivity by oxidizing with the hydroxyl radical (.OH) produced by the photoreduction in the anode chamber. Therefore, in order to continuously perform hydrogen evolution over a long period of time, it is necessary that a sufficiently large amount of polyacid ion exist at a concentration of less than the saturation point in the anode electrolyte. This is an essential factor in view of the effective light absorption. From these facts, it is desirable that the polytungstic acid used have an ion concentration of $10^{-3}$–$10^{-2}$ mole, while the polyvanadic acid used have an ion concentration of $10^{-3}$–$4\times10^{-2}$ mole.

The alkylammonium ion is sufficient to be existent in an amount higher than the ion concentration of the polyacid used. As the alkylammonium ionic species, a monoalkylammonium such as methylammonium, ethylammonium, isopropylammonium, n-propylammonium or the like is preferable, but a polyalkylammonium such as diethylammonium, dibutylammonium, triethylammonium, tributylammonium or the like, which forms a precipitate by reacting in a low concentration with the polyacid ion, is not favorable in view of the hydrogen production with high efficiency.

In the anode chamber, it is required that the active material for the electrode is produced by light irradiation with a high efficiency and is sufficiently stably existent in the anode chamber. Furthermore, it is desirable that the reduction potential of the active material for the electrode is as large as possible in order to ensure the reduction of $H^+$ to $H_2$. From these facts, it is preferred that the pH of the anode electrolyte is within a range of 7–10.

In the cathode chamber, it is required that the cathode electrolyte is an $H^+$ solution exhibiting at least a positive redox potential with respect to the reduction potential of the active material because $H^+$ is reduced by the active material of the polyacid ion. Therefore, it is necessary that the cathode electrolyte be a highly acidic solution as far as possible, so that it has preferably a pH of not more than 1. Thus, there are favorably used acids which do not chemically attack the immersed electrode and glass frit partition, and among them sulfuric acid is optimum.

The electrode material used for the anode and cathode is necessarily electrically conductive and insoluble in the electrolyte without reacting with the electrolyte during light irradiation as is apparent from the theory of the present invention. Therefore, use may be made of Pt, W, Pd, C, $TiO_2$, $SnO_2$, $In_2O_3$ and the like as the electrode material, which are not intended as limitations thereof.

The following examples are given in illustration of the present invention and are not intended as limitations thereof.

EXAMPLE 1

To an aqueous solution of $10^{-2}$ mole of commercially available ammonium paratungstate there was added an aqueous solution of 5 moles oof isopropylammonium perchlorate (prepared by reacting isopropylamine with perchloric acid) so as to adjust the concentration of the ammonium paratungstate to about $10^{-1}$ mole, and then the pH of the resulting solution was adjusted to 7 with sodium hydroxide to form an anode electrolyte. As a cathode electrolyte there was used 5 N $H_2SO_4$. As an anode there was used a platinum plate having a surface area of 20 mm², while a platinum wire having a length of 5 cm (1 mm$\phi$) was used as a cathode. These electrolytes, anode and cathode were employed in a photoelectrical cell as shown in the FIGURE. Then, a light emitted from a 500 W super-high pressure mercury vapor lamp, made by Ushio Denki Co., Ltd., was condensed through a quartz lens and irradiated onto the platinum plate, whereby the evolution of hydrogen gas from the platinum wire was continuously observed (which was confirmed by gaschromatography). After light irradiation was performed for 3 hours, about 0.09 ml of hydrogen gas was obtained in a gas burette at room temperature.

EXAMPLE 2

To an aqueous solution of $10^{-2}$ mole of commercially available ammonium metavanadate there was added an aqueous solution of 5 moles of isopropylammonium perchlorate so as to adjust the concentration of the ammonium metavanadate to about $10^{-1}$ mole, and then the pH of the resulting solution was adjusted to 7 with sodium hydroxide to form an anode electrolyte. As a cathode electrolyte there was used 5 N $H_2SO_4$. As an anode there was used a platinum plate having a surface area of 20 mm², while a platinum wire having a length of 5 cm (1 mm$\phi$) was used as a cathode. These electrolytes, anode and cathode were employed in a photoelectrical cell as shown in the FIGURE. Then, a light emitted from a 500 W super-high pressure mercury vapor lamp, made by Ushio Denki Co., Ltd., was condensed through a quartz lens and irradiated to the platinum plate, whereby the evolution of hydrogen gas from the platinum wire was continuously observed, after 3 hours of which about 0.07 ml of hydrogen gas was obtained at room temperature.

EXAMPLE 3

The same procedure as described in Example 1 was repeated except that the pH of the anode electrolyte was 10, whereby 0.2 ml of hydrogen gas was obtained.

EXAMPLE 4

The same procedure as described in Example 2 was repeated except that the pH of the anode electrolyte was 10, whereby 0.09 ml of hydrogen gas was obtained.

EXAMPLE 5

The same procedure as described in Example 1 was repeated except that an aqueous solution of 2 moles of methylammonium perchlorate was used instead of the aqueous solution of 5 moles of isopropylammonium perchlorate, whereby about 0.09 ml of hydrogen gas was obtained.

EXAMPLE 6

The same procedure as described in Example 5 was repeated except that the pH of the anode electrolyte was 10, whereby 0.2 ml of hydrogen gas was obtained.

EXAMPLE 7

The same procedure as described in Example 6 was repeated except that ammonium metavanadate was used instead of ammonium paratungstate, whereby 0.1 ml of hydrogen gas was obtained.

EXAMPLE 8

The same procedure as described in Example 3 was repeated except that $TiO_2$ single crystal was used as an anode instead of the platinum plate, whereby 0.02 ml of hydrogen gas was obtained.

EXAMPLE 9

The same procedure as described in Example 8 was repeated except that ammonium metavanadate was used instead of ammonium paratungstate, whereby 0.01 ml of hydrogen gas was obtained.

As apparent from the above, the present invention utilizes the photogalvanic effect of cheap alkylammonium salt of polytungstic acid or polyvanadic acid contained in the electrolyte and is different from the conventional photoelectrolysis of water utilizing the photochemical effect of a semiconductor electrode, so that the material of the electrode to be used may be chosen optionally. Further, the hydrogen evolution efficiency according to the present invention is about 4% higher than that of the conventional hydrogen evolution apparatus developing the highest efficiency (hydrogen evolution rate is 1%) wherein n-type $SrTiO_3$ electrode as an anode and a platinum cathode are used in an electrolyte of 1 N NaOH. That is, the present invention has great industrial merits for producing hydrogen simply and cheaply.

What is claimed is:

1. A process for the production of hydrogen comprising immersing an anode into an aqueous solution of an alkylammonium salt of polytungstic acid or polyvanadic acid as an anode electrolyte, immersing a cathode into an aqueous solution of an acid as a cathode electrolyte, isolating both said electrolytes from each other, electrically connecting both the electrodes to each other and irradiating a light onto said anode electrolyte, whereby hydrogen is evolved at said cathode.

2. A process as claimed in claim 1, wherein said polytungstic acid has an ion concentration of $10^{-3}-10^{-2}$ mole.

3. A process as claimed in claim 1, wherein said polyvanadic acid has an ion concentration of $10^{-3}-4\times10^{-2}$ mole.

4. A process as claimed in claim 1, wherein said alkylammonium is selected from methylammonium, ethylammonium, isopropylammonium and n-propylammonium.

5. A process as claimed in claim 1, wherein said anode electrolyte has a pH of 7-10.

6. A process as claimed in claim 1, wherein said acid is sulfuric acid.

7. A process as claimed in claim 1, wherein said cathode electrolyte has a pH of not more than 1.

8. A process as claimed in claim 1, wherein each of said anode and cathode is made of a material selected from Pt, W, Pd, C, $TiO_2$, $SnO_2$ and $In_2O_3$.

9. A process as defined in claim 1, wherein said aqueous solution of an alkylammonium salt of polytungstic acid or polyvanadic acid is formed by an alkylammonium perchlorate solution.

10. A process as defined in claim 1, wherein the light is irradiated onto the anode electrolyte by directing the light onto the anode.

* * * * *